(12) United States Patent
Hedrick et al.

(10) Patent No.: US 7,854,878 B2
(45) Date of Patent: Dec. 21, 2010

(54) METHOD FOR FORMING AND ALIGNING CHEMICALLY MEDIATED DISPERSION OF MAGNETIC NANOPARTICLES IN A POLYMER

(75) Inventors: James Lupton Hedrick, Pleasanton, CA (US); Delia Jane Milliron, Menlo Park, CA (US); Alshakim Nelson, Fremont, CA (US); Russell Clayton Pratt, Los Gatos, CA (US)

(73) Assignee: International Business Machines Corporation, Armonk, NY (US)

( * ) Notice: Subject to any disclaimer, the term of this patent is extended or adjusted under 35 U.S.C. 154(b) by 386 days.

(21) Appl. No.: 11/625,839

(22) Filed: Jan. 23, 2007

(65) Prior Publication Data

US 2009/0184445 A1 Jul. 23, 2009

(51) Int. Cl.
*B29D 7/01* (2006.01)
*H01F 1/00* (2006.01)
*C08J 5/18* (2006.01)
*H05B 6/00* (2006.01)

(52) U.S. Cl. .................. 264/435; 264/101; 264/108; 264/212; 264/216; 264/331.19; 264/427; 264/429; 148/105; 148/121

(58) Field of Classification Search .......... 264/101, 264/108, 212, 216, 331.19, 427, 429, 435; 419/60; 148/105, 121

See application file for complete search history.

(56) References Cited

U.S. PATENT DOCUMENTS

| | | | | |
|---|---|---|---|---|
| 3,331,712 A | * | 7/1967 | Griest, Jr. et al. | ............ 148/105 |
| 5,281,482 A | * | 1/1994 | Martens et al. | ........... 428/425.9 |
| 6,455,815 B1 | * | 9/2002 | Melgaard et al. | ............. 219/390 |
| 6,464,894 B1 | * | 10/2002 | Antochin et al. | .......... 252/62.54 |
| 2002/0188052 A1 | * | 12/2002 | Yadav et al. | ................. 524/435 |
| 2004/0191570 A1 | * | 9/2004 | Edwards et al. | .............. 428/693 |
| 2004/0251652 A1 | * | 12/2004 | Sautier et al. | .......... 280/124.155 |
| 2005/0116194 A1 | | 6/2005 | Fuchs et al. | |
| 2005/0161119 A1 | | 7/2005 | McKinght et al. | |

(Continued)

OTHER PUBLICATIONS

Harrell, et al.; Effect of metal additives on $L1_0$ ordering of chemically synthesized FePt nanoparticles; 2005 Acta Materialia Inc., Published by Elsevier Ltd.; pp. 411-416.

(Continued)

*Primary Examiner*—Khanh Nguyen
*Assistant Examiner*—Carson Gross
(74) *Attorney, Agent, or Firm*—Schmeiser, Olsen & Watts

(57) ABSTRACT

A method including providing Au-doped Co nanoparticles. The nanoparticles include a combination of non-ferromagnetic nanoparticles and weakly ferromagnetic nanoparticles. The nanoparticles each have an exterior surface. The surfaces of the nanoparticles are functionalized with 7-(5-uracil-ylcarbamoyl)heptanoic acid. A polymer is provided having a general formula including a uracil group. A dispersion is formed by agitating a solution of the nanoparticles. The solution is spin cast into a film. The film is heated under vacuum at a first temperature, $T_{FM}$, resulting in inducing ferromagnetism in the non-ferromagnetic nanoparticles and converting the non-ferromagnetic nanoparticles to ferromagnetic nanoparticles, and resulting in enhancing ferromagnetism in the weakly ferromagnetic nanoparticles. The nanoparticles are aligned such that magnetic easy axes of the nanoparticles are oriented by applying a magnetic field to the dispersion while at a second temperature less than $T_{FM}$. The axes align in a plane parallel to a plane of the film.

22 Claims, 5 Drawing Sheets

U.S. PATENT DOCUMENTS

2006/0194039 A1* 8/2006 Hattori et al. ................ 428/323
2009/0053512 A1* 2/2009 Pyun et al. ................... 428/336

OTHER PUBLICATIONS

Yan, et al.; Enhanced Chemical Ordering and Coercivity in FePt Alloy Nanoparticles by Sb-Doping: Advanced Materials, 17 (2005); pp. 2233-2237.

Rong, et al.; Surface derivatization of nano-CdS clusters and its effect on the performance of CdS quantum dots in solvents and polymeric metrices; Applied Surface Science 228 (2004); pp. 176-190.

Shenhar, et al.; Nanoparticles: Scaffolds and Building Blocks; American Chemical Society (2003); Accounts of Chemical Research, vol. 36, No. 7; pp. 549-561.

Zhou, et al.; A Simple In Situ Hydrogren Bond Interaction Homogeneous Dispersion of Gold Nanoparticles in $SiO_2$ Matrix Using Dendrimer as Template; The Chemical Society of Japan; Chemistry Letters (2002); pp. 1170-1171.

Boal, et al.; Bricks and mortar self-assembly of nanoparticles; Elsevier Science Ltd; Tetrahedron 58 (2002); pp. 765-770.

Chujo, et al.; Organic Polymer Hybrids with Silica Gel Formed by Means of the Sol-Gel Method; Advances in Polymer Science, vol. 100; Springer-Verlag Berlin Heidelberg 1992; pp. 11-29.

* cited by examiner

METHOD FOR FORMING AND ALIGNING CHEMICALLY MEDIATED DISPERSION OF MAGNETIC NANOPARTICLES IN A POLYMER

FIELD OF THE INVENTION

The invention relates to a method for forming and aligning a chemically mediated dispersion of magnetic nanoparticles in a polymer matrix.

BACKGROUND OF THE INVENTION

Magnetic nanoparticles dispersed in a polymer thin film form the active recording layer in magnetic tape. To enhance the density of data that can be stored magnetically in such a composite thin film, it is desirable to use small (nanoscale) particles, at high loadings (>50% by weight), and to disperse these nanoparticles evenly within the polymer matrix. In addition, the nanoparticles must be ferromagnetic with large magnetic dipoles at room temperature to be useful for storing data. Dispersing such ferromagnetic nanoparticles evenly within the polymer matrix is problematic due to the strong interparticle magnetic forces which tend to induce aggregation and agglomeration. A method is needed to produce well-dispersed magnetic nanoparticles within a polymer matrix.

SUMMARY OF THE INVENTION

The present invention relates to a method, comprising:
providing a dispersion comprising nanoparticles in a matrix, wherein said nanoparticles are non-ferromagnetic nanoparticles, weakly ferromagnetic nanoparticles, or a combination thereof;
annealing said dispersion at a first temperature $T_{FM}$, thereby converting any non-ferromagnetic nanoparticles in said dispersion to ferromagnetic nanoparticles, and enhancing ferromagnetism in any weakly ferromagnetic nanoparticles in said dispersion; and
after said annealing, applying a magnetic field to said dispersion to align said nanoparticles, wherein magnetic easy axes of said ferromagnetic nanoparticles are oriented in substantially the same direction while said dispersion is heated to a second temperature $T_A$.

The present invention relates to a method, comprising:
providing non-ferromagnetic nanoparticles, said nanoparticles each having an exterior surface;
functionalizing said surfaces of said non-ferromagnetic nanoparticles;
providing a polymer wherein the chemical structure of said polymer has at least one functional group;
after said functionalizing, forming a dispersion of said non-ferromagnetic nanoparticles in said polymer;
inducing ferromagnetism in said nanoparticles in said polymer, thereby converting said non-ferromagnetic nanoparticles to ferromagnetic nanoparticles; and
aligning said ferromagnetic nanoparticles such that magnetic easy axes of said ferromagnetic nanoparticles are oriented in substantially the same direction.

The present invention relates to methods to produce well-dispersed magnetic nanoparticles within a polymer matrix.

BRIEF DESCRIPTION OF THE DRAWINGS

The features of the invention are set forth in the appended claims. The invention itself, however, will be best understood by reference to the following detailed description of illustrative embodiments when read in conjunction with the accompanying drawings.

DETAILED DESCRIPTION OF THE INVENTION

Figure 1:
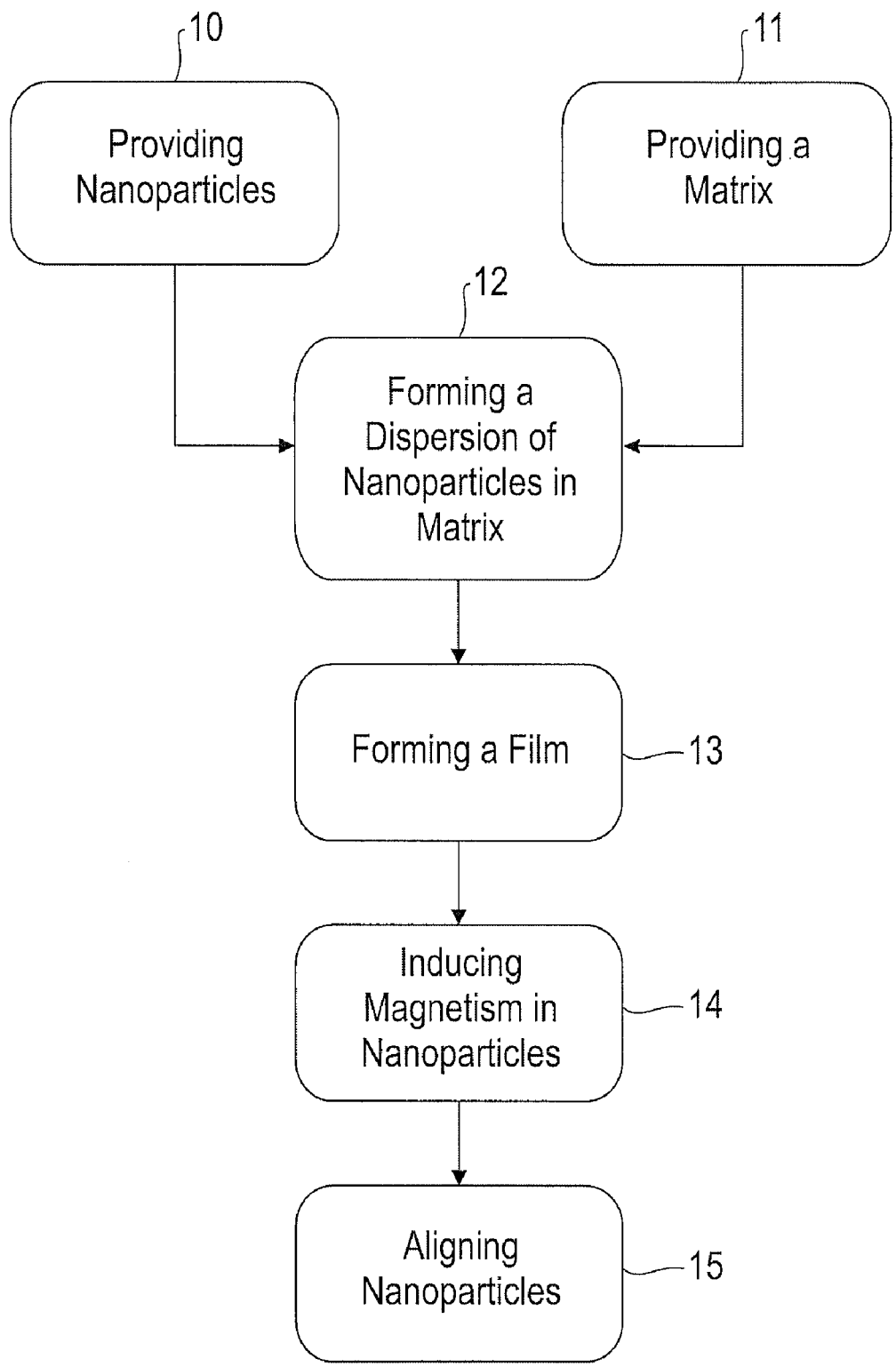
FIG. 1 is a flowchart which illustrates generalized method steps 10-15, in accordance with embodiments of the present invention.

Although certain embodiments of the present invention will be shown and described in detail, it should be understood that various changes and modifications may be made without departing from the scope of the appended claims. The scope of the present invention will in no way be limited to the number of constituting components, the materials thereof, the shapes thereof, the relative arrangement thereof, etc., and are disclosed simply as examples of embodiments. The features and advantages of the present invention are illustrated in detail in the accompanying drawings, wherein like reference numerals refer to like elements throughout the drawings. Although the drawings are intended to illustrate the present invention, the drawings are not necessarily drawn to scale.

FIG. 1 is a flowchart which illustrates generalized method steps 10-15 for an embodiment of the present invention, which may provide a method for evenly dispersing ferromagnetic or weakly ferromagnetic nanoparticles in a polymer matrix. A nanoparticle may be defined as a particle having a solid composition and a minimal structural diameter in a range from about 1 nanometer (nm) to about 500 nm. Step 10 provides nanoparticles, which may be non-ferromagnetic, weakly ferromagnetic or a combination. The nanoparticles may be comprised of a single element or compound, or may be a mixture of nanoparticles of two or more different elements or compounds. Step 11 provides a matrix for the dispersion of nanoparticles. The matrix may be a macromolecular compound, such as a polymer.

Step 12 forms a dispersion of the nanoparticles in the matrix. The dispersion may be formed by combining or mixing the nanoparticles with a polymer in a solution, for example, but may include direct mixing such as when the polymer is in a molten or otherwise fluid state, or during the polymerization reaction when the polymer is formed. To facilitate dispersion, the nanoparticles' exterior surfaces may be functionalized with chemical functional groups by reaction with a functionalizing reagent such as a functionalized surfactant prior to dispersion in the matrix.

The combination of nanoparticles in the matrix may be formed into a film or other solid form in step 13 to provide a dispersion comprising non-ferromagnetic nanoparticles in a solid matrix, wherein the thickness of the composite film (comprising the matrix with dispersed nanoparticles) may be between about 3 nanometers (nm) and about 50 microns. The film may be made into a magnetic tape for use as a magnetic recording medium. Film formation may include processes such as spin coating, doctor blading, dip coating, and the like, and may be used individually or in combinations thereof in accordance with the method of the present invention.

Figure 2:
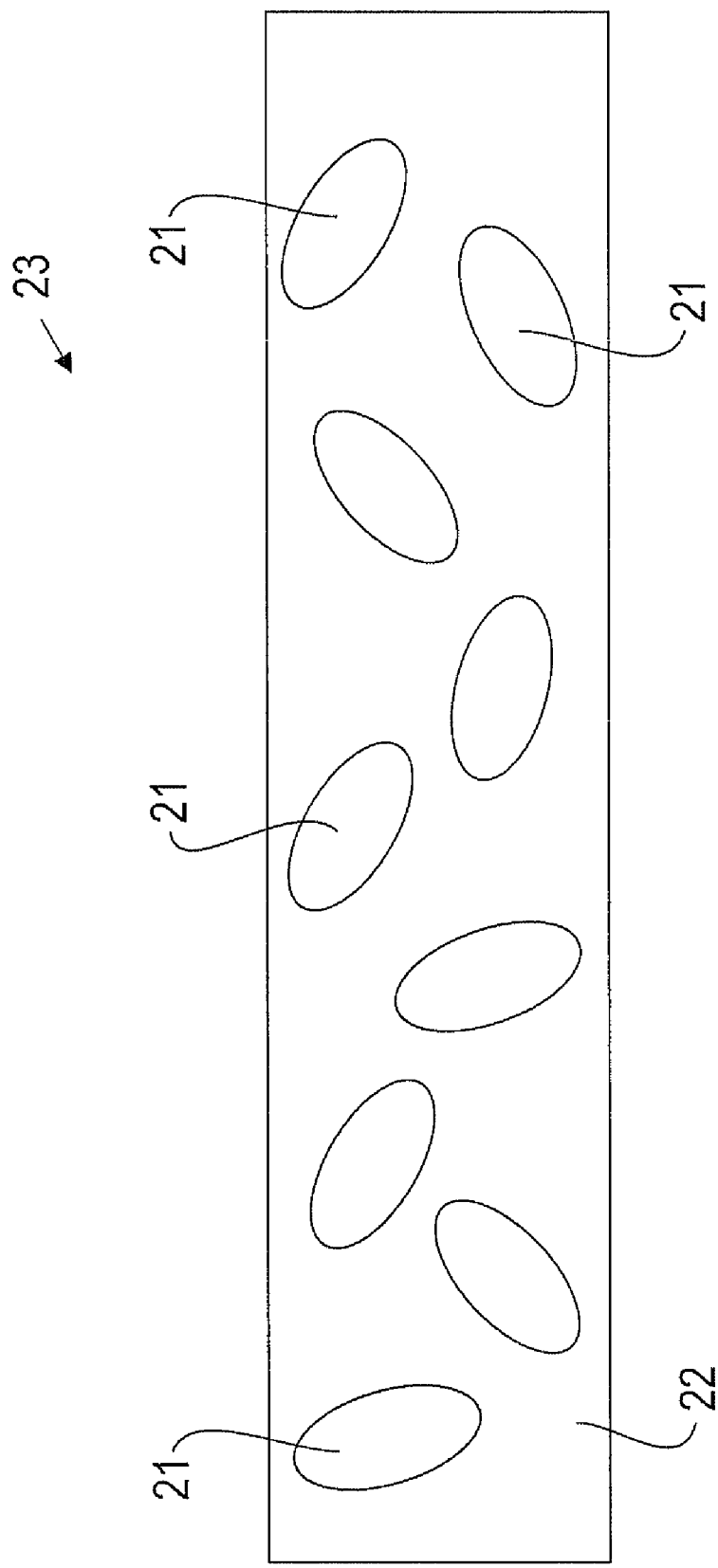
FIG. 2 is an illustration of a dispersion of nanoparticles in a matrix, in accordance with embodiments of the present invention.

FIG. 2 is an illustration of a dispersion 23 of nanoparticles 21 in a matrix 22, where the dispersion has been formed into a film.

Figure 3:
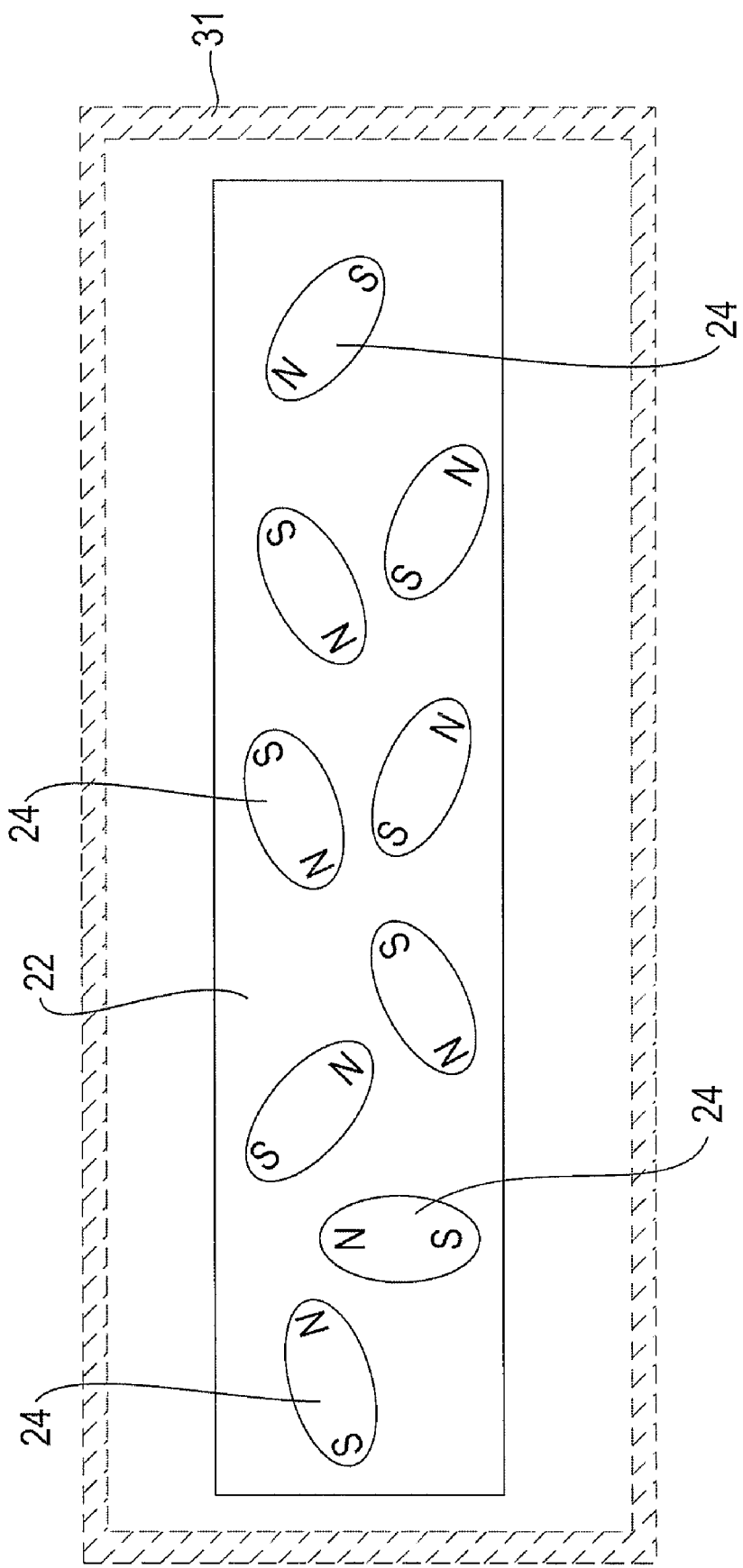
FIG. 3 is an illustration of a dispersion of nanoparticles in a matrix wherein the dispersion may be annealed, in accordance with embodiments of the present invention.

The dispersion 23 may be annealed, as in step 14 of FIG. 1 and as illustrated in FIG. 3, by heating the dispersion 23 to a temperature, $T_{FM}$, wherein ferromagnetism is induced in the dispersed non-ferromagnetic nanoparticles 21. Inducing ferromagnetism may involve converting the crystalline structure from one phase to another. This may convert the non-ferromagnetic nanoparticles 21 to ferromagnetic particles 24 by converting them to a ferromagnetic crystalline phase. If the nanoparticles are weakly ferromagnetic, heating the dispersion to $T_{FM}$ may enhance the ferromagnetism in the weakly ferromagnetic nanoparticles by increasing the proportion of the strongly ferromagnetic phase, which may already be partly present, and thereby converting the weakly ferromagnetic nanoparticles into enhanced or strongly ferromagnetic particles. The specific phases involved may depend on the material the nanoparticles are made from. $T_{FM}$ may be determined experimentally for a given type and size of nanoparticles by annealing the nanoparticles in the dispersion and recording the x-ray diffraction patterns after annealing at different temperatures to see at what temperature the desired phase is produced. Heating may be accomplished using a means for heating 31 such as an oven, heating surface, radiant heating elements, or any other means for heating the dispersion. $T_{FM}$ may be in the range between about 100° C. and about 500° C.

Dispersion of the nanoparticles 21 within the polymer matrix 22 prior to inducing or enhancing magnetism in the nanoparticles 21 may reduce nanoparticle aggregation which may be caused by strong interparticle ferromagnetic attraction. Such a method may provide an even and uniform dispersion wherein nanoparticles are substantially separated from one another. As a solid film, the movement of nanoparticles within the polymer matrix may be limited to localized rotations, whereas general migration and agglomeration of nanoparticles may be prohibited. Inducing magnetism within the solid phase may allow for the creation of ferromagnetic nanoparticles 24 that are already evenly dispersed within a polymer matrix.

Figure 4:
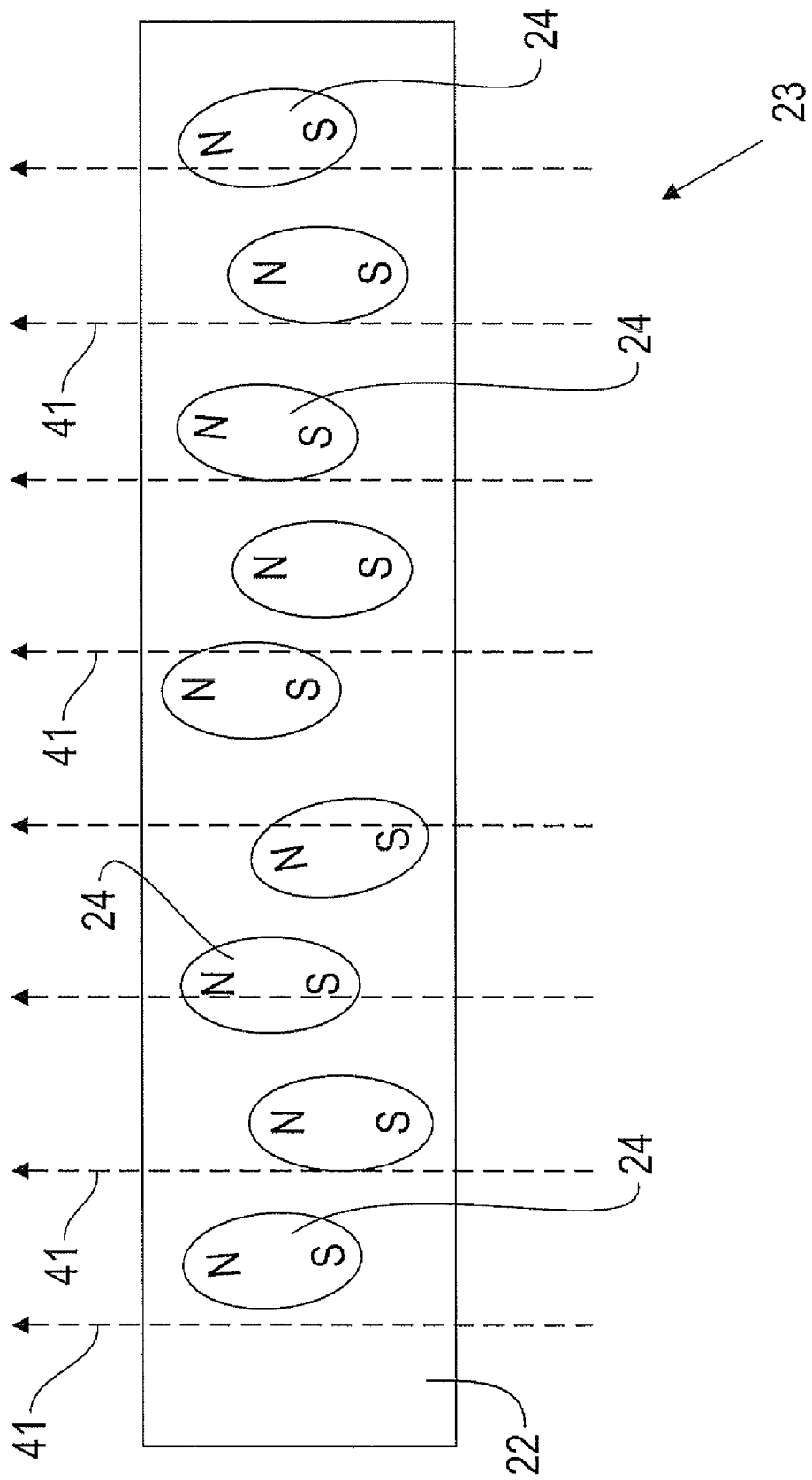
FIG. 4 is an illustration of a dispersion of ferromagnetic nanoparticles in a matrix wherein the ferromagnetic nanoparticles may be aligned, in accordance with embodiments of the present invention.

The ferromagnetic nanoparticles 24 may be aligned as in step 15 and as illustrated in FIG. 4 by applying a magnetic field 41 to the dispersion 23 while it is being heated at a temperature, $T_A$. When the nanoparticles 24 are aligned, their magnetic easy axes may be oriented in substantially the same direction. For example, in the case of a magnetic tape, the magnetic easy axes of the nanoparticles may be aligned perpendicular to the plane of the tape. In a second example, the magnetic easy axes of the aligned nanoparticles may be in a plane parallel to the plane of the tape and oriented along the length of the tape. The nanoparticles 24 may be physically rotated or moved during alignment, which may involve the breaking and reforming of reversible bonds (such as hydrogen bonds) with the polymer matrix 22, and may be facilitated by heating at $T_A$. The chemical interactions between the nanoparticles 24 and the polymer matrix 22, which may facilitate even dispersion, may be labile enough at $T_A$ to allow the nanoparticles 24 to rotate within the polymer matrix 22 under the influence of the applied magnetic field 41. Such alignment may occur provided the nanoparticles' rotations within the polymer matrix 22 are not inhibited, such as through particle aggregation, polymer matrix rigidity, or steric hindrance. The field strength of the magnetic field 41 to align the nanoparticles 24 may be between 500 oersteds (Oe) and 20 kilooersteds (kOe). $T_A$ may be in the range between about 50° C. and about 500° C.

The temperatures $T_{FM}$ and $T_A$ may vary with the polymer composition, nanoparticle composition, and dopant concentration and type. $T_{FM}$ maybe be greater than $T_A$, less than $T_A$, or aligning the nanoparticles and inducing ferromagnetism in the nanoparticles may be carried out at substantially the same temperature, where $T_{FM}$ and $T_A$ may be substantially the same temperature.

Specific particle-matrix interactions may discourage particle aggregation while allowing particle rotation within the matrix to facilitate magnetic field-induced nanoparticle alignment, even at high loading, such as greater than 50% nanoparticle concentration by weight. Nanoparticle loadings may be in the range of about 5% to about 99% concentration by weight within the scope of the present invention. The desirable conditions may be achieved via thermally reversible interactions between the nanoparticles and the polymer matrix, such as by chemically favorable interactions between the nanoparticles' functionalized surfaces and the polymer. Such interactions may include nanoparticle preferential affinity for functional groups within the polymer's chemical structure, achieved through intermolecular forces such as dipole-dipole forces, hydrogen bonding, ionic bonding, a combination of these, and any other intermolecular forces which may discourage particle aggregation.

Functional groups on the surfaces of functionalized nanoparticles may preferentially form bonds (such as hydrogen bonds for example) with functional groups within the polymer matrix. The functional groups on the polymers and nanoparticles may be chosen such that self-interactions between the polymer functional groups themselves or between the nanoparticle functional groups themselves are minimized in favor of the complementary interactions between the polymer and nanoparticle functional groups. The strength of the self-interactions versus the complementary interactions may be determined experimentally, such as by Nuclear Magnetic Resonance (NMR) spectroscopy. An association constant $K_a$, which represents the strength of the interactions, may be determined from these experiments for each hydrogen bonding interaction. A larger value of $K_a$ may represent a stronger interaction between functional groups. A preferential bond between polymer and nanoparticle functional groups may prevent agglomeration of nanoparticles while in solution and in the solid film, since the functional groups associated with nanoparticles may have a higher affinity for the functional groups of the polymer than for those on the surfaces of other nanoparticles. Where preferential bonding is not present, nanoparticles might alternatively bond to one another and form large clusters within solution or in the solid film matrix. Preferential affinity for polymer functional groups might allow for increased solubility of the nanoparticles within the polymer and likewise may provide higher loading of the film. Preferential affinity may be attained through the inclusion of specific functional groups within the polymer's chemical structure such as nitrogen containing groups such as guanidinium, uracilyl, urea, imine, amide, or amine groups, for example. Such nitrogen containing functional groups may preferentially form hydrogen bonds with carboxylate, hydroxyl, or other similar oxygen containing groups on the surfaces of so functionalized nanoparticles. Similar preferential bonding may be observed from other functional groups that may exhibit hydrogen bonding.

The temperature $T_A$ required during alignment of the nanoparticles may be tailored by the selection of functional groups in the matrix as well as the functional groups on the nanoparticles. The strength of the bonding between the nanoparticles and the matrix may directly affect the temperature required. The temperature, or thermal energy, required may be related to both the strength of the interaction (such as hydrogen bonding), and the number of interactions that exist between the nanoparticle and polymer matrix. For example, stronger hydrogen bonding may require higher temperatures to overcome nanoparticle-matrix attraction forces and allow movement of the nanoparticles during alignment. A minimum amount of thermal energy may be required to break the hydrogen bonding interactions. The appropriate choice of hydrogen bonding interactions, such as based on the strength of the interaction, may allow for the adjustment of $T_A$ as required.

The concentration and type of dopant within the nanoparticles (such as gold doped iron-platinum compared with antimony doped iron-platinum), may affect the value of $T_{FM}$ required to induce ferromagnetism in the nanoparticles. The induction of ferromagnetism may be accompanied by a change in the crystalline phase of the nanoparticles, such as a change to the hexagonal close packed phase (hcp), for example. The concentration and composition of dopant within the structure of the nanoparticles may affect the energy required for crystalline structural change. The presence of a dopant within the nanoparticles may lower the temperature required to induce ferromagnetism in the nanoparticles, where a lower temperature may further reduce the possibility of thermal degradation of the polymer during the induction process.

The present invention may utilize a thermally stable polymer matrix material which is stable at least up to the higher of $T_{FM}$ and $T_A$. A high thermal stability of the polymer matrix may provide a stabile structure for the matrix while heating to induce ferromagnetism in the non-ferromagnetic nanoparticles or increase ferromagnetism in weakly ferromagnetic nanoparticles. A polymer matrix with low thermal stability may not be stabile enough at $T_{FM}$ or $T_A$ to survive the annealing or alignment process and may decompose.

In one embodiment of the present invention, the polymer matrix may be synthesized according to the following representative reaction:

where n is between about 8 and about 200, and where R may be:

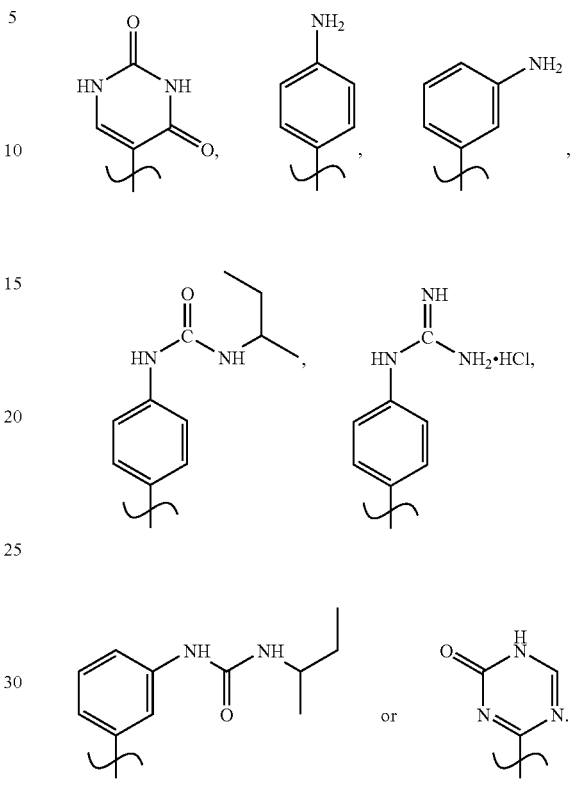

It is understood that in the reaction above, compound I is reacting with compound II in the presence of compound III to yield compound IV. The equation below represents the reaction of equation 1 above where

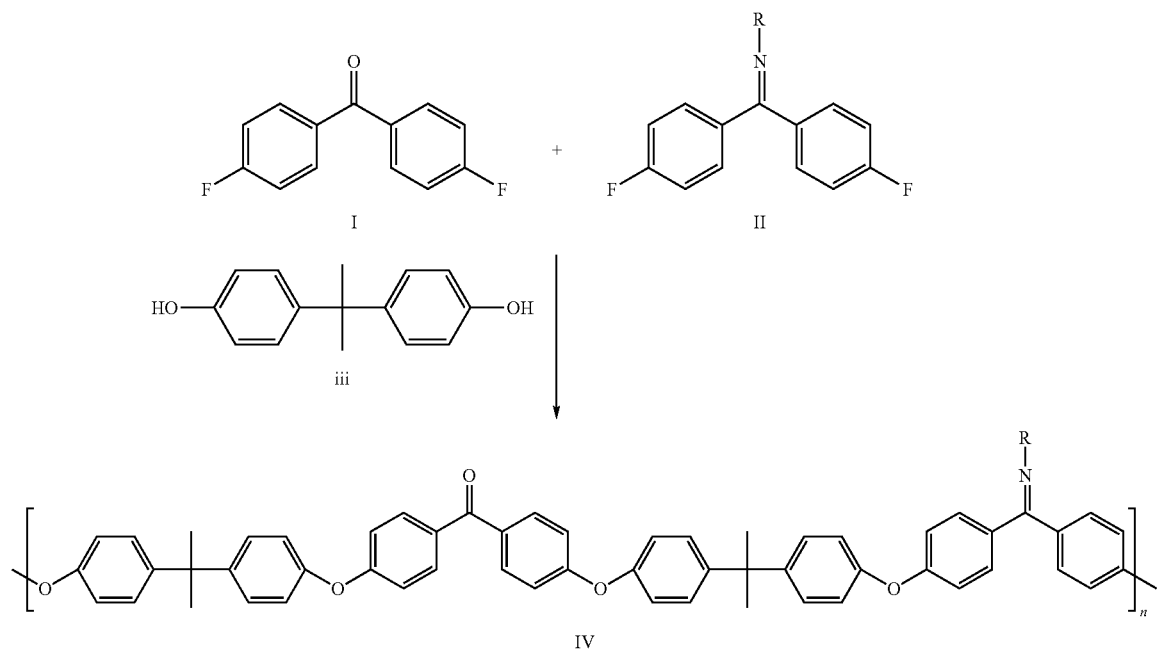

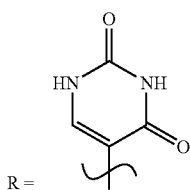

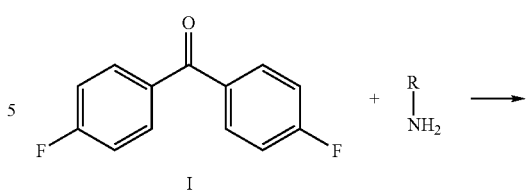

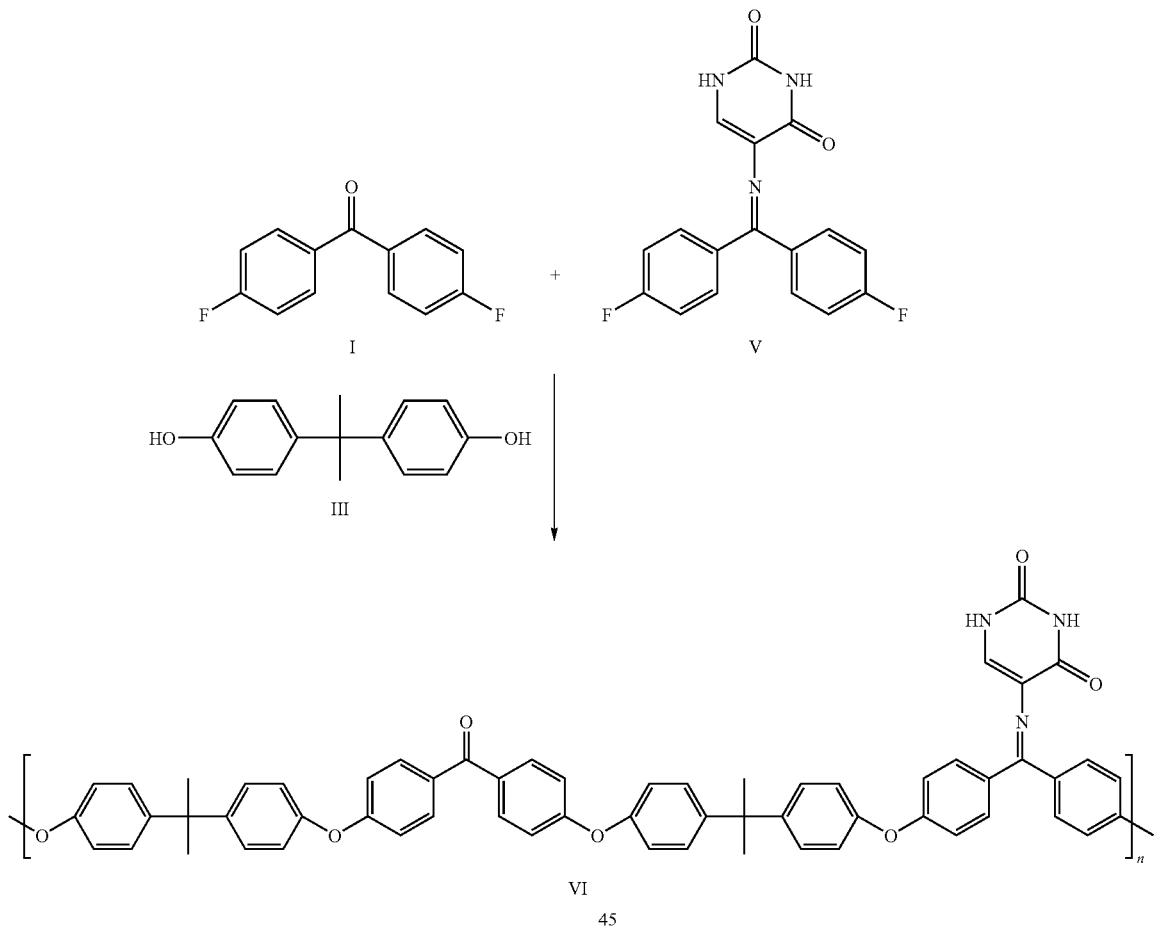

and where n is between 8 and 200.

EXAMPLE 1

A 50 ml three-neck round bottom flask fitted with a nitrogen inlet, overhead stirrer, and a Dean Stark trap, was charged with one equivalent (1 g, 4.4 millimoles (mmol)) of III (2,2-bis(4-hydroxyphenyl)propane) and one equivalent of a mixture of I (4,4'-difluorobenzophenone) (0.8728 g, 4.0 mmol) (90%) and the 5-aminouracil ketimine V (0.144 g, 0.44 mmol) (10%). Twelve milliliters (ml) of N,N-Dimethylformamide (DMF) were added, followed by finely ground potassium carbonate (5.0 g) and toluene (20 ml). The reaction was stirred and heated to 140° C. for 24 hours, after which the toluene in the Dean Stark trap was collected and the temperature was increased to 160° C. for about 24 hours. The mixture became extremely viscous, was dissolved in tetrahydrofuran and precipitated from methanol (500 ml) to give a pale brown brittle solid (1.28 g).

The difluoro ketimine II may be synthesized by the following generalized reaction:

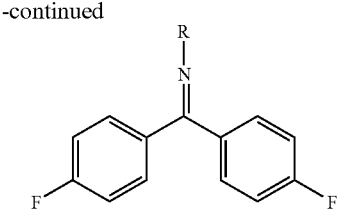

EXAMPLE 2

In one embodiment of the present invention, a difluoro ketimine monomer may be synthesized according to the above equation, where

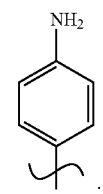

R is

A 250 ml three-neck round bottom flask was charged with 4.36 g (0.02 mole (mol)) of 4,4'-difluorobenzophenone and five equivalents of 1,4-phenylenediamine (10.81 g, 0.1 mmol). The reactants were stirred in p-xylene (120 ml) and a catalytic amount of p-toluene sulfonic acid (0.20 g, 5% weight/weight) was added to the solution. The flask was fitted with a nitrogen inlet and a Dean Stark apparatus and the reaction mixture was allowed to stir at 140° C. for about 24 hours. Thereafter, the dark brown solution was allowed to cool to room temperature and the solvent was removed in vacuo. The product was separated from the excess 1,4-phenylenediamine starting material by running the crude reaction mixture through a silica gel column using ethyl acetate/hexane. Fractions containing the pure difluoro ketimine product were dried in vacuo to give a vivid yellow solid (3.58 g, 58% yield).

EXAMPLE 3

In one embodiment of the present invention, the monomer N-(5-uracil-yl)-4,4'-difluorobenzophenone imine IX may be synthesized according to the following reaction:

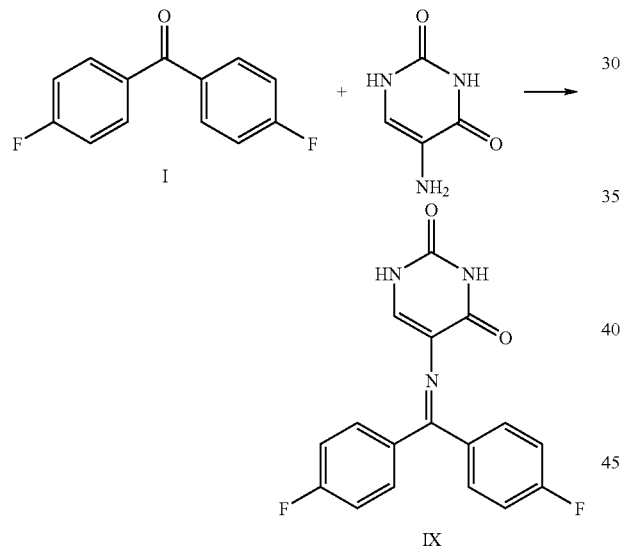

To a round bottom flask equipped with an overhead stirrer, 1.16 grams (0.009 mol) of 5-aminouracil was charged along with 6 grams (0.027 mol) of 4,4'-difluorobenzophenone and washed in with a 50/50 (volume/volume) n-methylpyrrolidone/n-cyclohexylpyrrolidone solvent mixture and heated to 180° C. for about 3 days. The mixture was isolated in hexane and recrystallized twice from isopropanol. The product was rinsed with isopropanol, suction dried, and vacuum dried in an oven overnight.

EXAMPLE 4

In one embodiment of the present invention, a difluorourea monomer VII may be synthesized according to the following reaction:

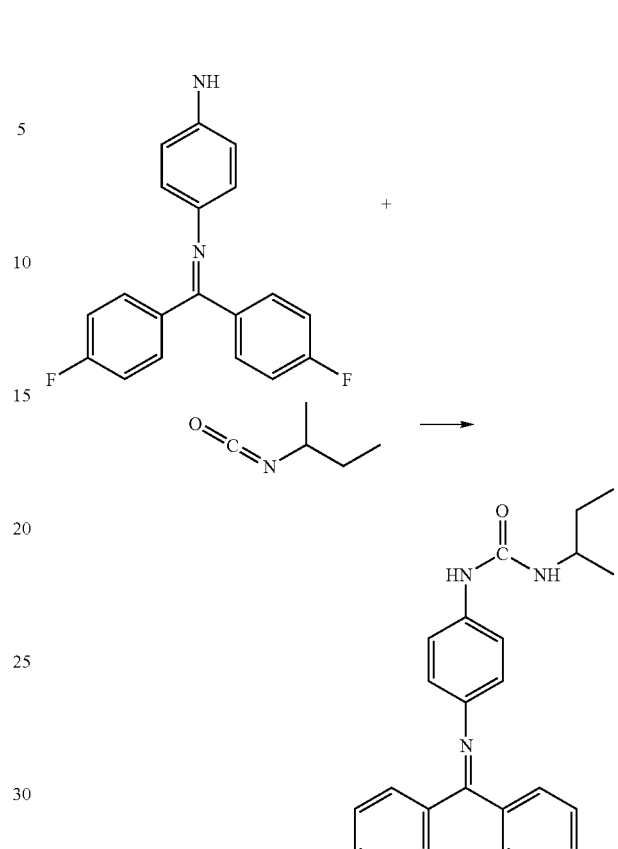

The 1,4-phenylenediamine ketimine (0.308 g, 1 mmol) was dissolved in toluene (35 ml). 1-Isocyanatobutane (0.115 g, 1 mmol) was added and the reaction was allowed to stir at 100° C. for 24 hours. The yellow solution was then allowed to cool to room temperature and the solvent was removed in vacuo to give a yellow solid (0.32 g, 78% yield).

EXAMPLE 5

In one embodiment of the present invention, a difluoroguanidinium monomer VIII may be synthesized according to the following reaction:

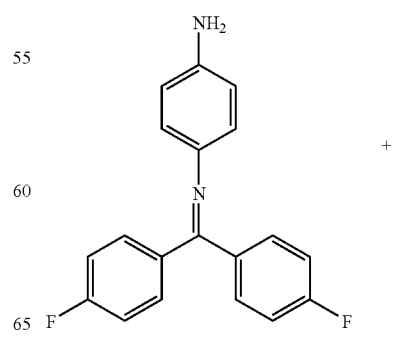

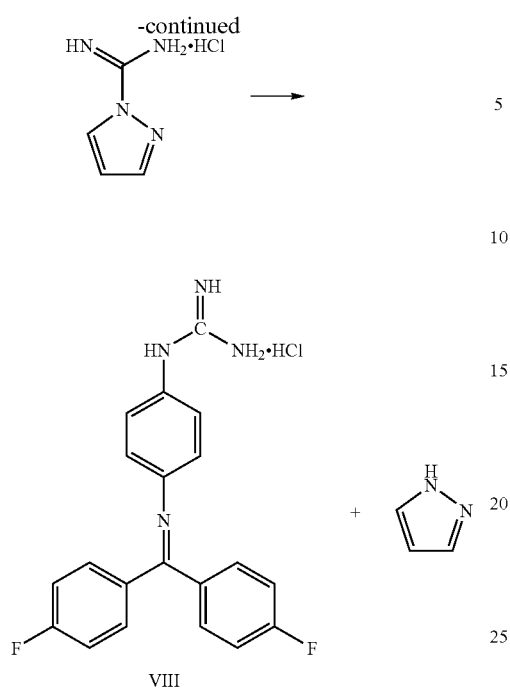

A mixture of 1,4-phenylenediamine ketimine (1.233 g, 4 mmol), 1-H-pyrazole-1-carboxamide (0.586 g, 4 mmol) and nitrobenzene (1.0 ml) was refluxed at 160° C. for 5 hours. After cooling to room temperature, diethyl ether (10 ml) was added and the crude product separated as a brown oil upon refrigeration for about 1 hour. The supernatant was removed by decantation and the residue dried in vacuo.

In one embodiment of the present invention, the polymer matrix may be synthesized according to the following representative reaction:

where n may be between about 8 and about 200, and where $R^1$ may be

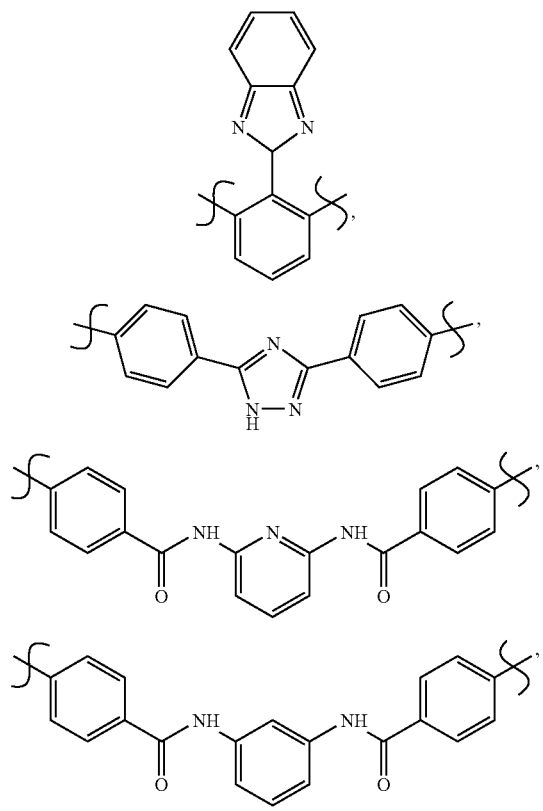

and other similar structures.

The above difluorinated monomer X may be synthesized according to the following examples.

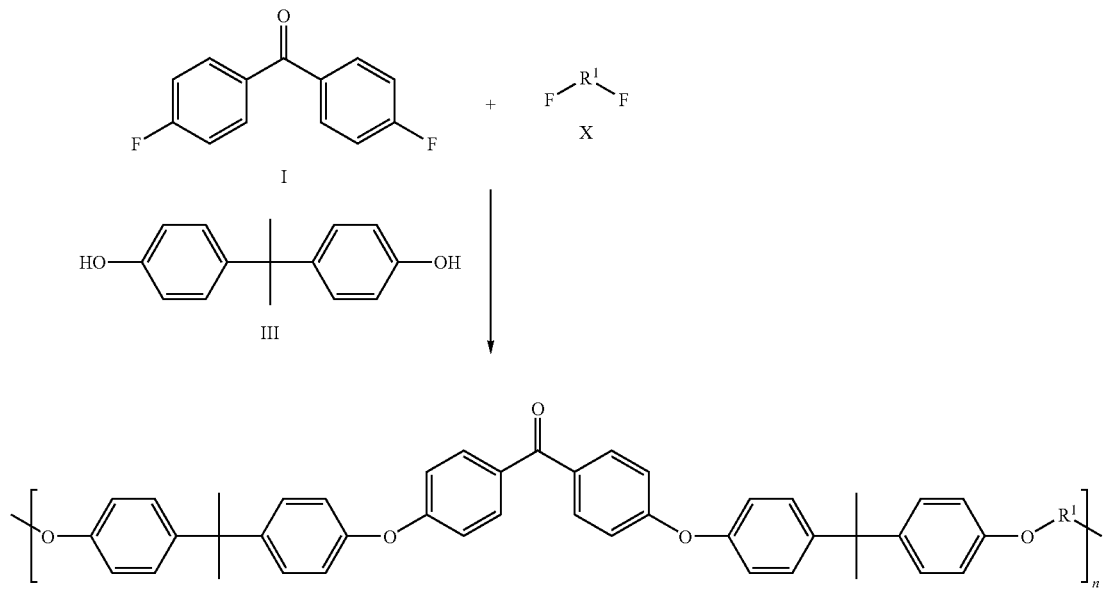

EXAMPLE 5

In one embodiment of the present invention, the monomer XI (1,3-bis(4-fluorobenzoylamino)benzene) may be synthesized according to the following reaction:

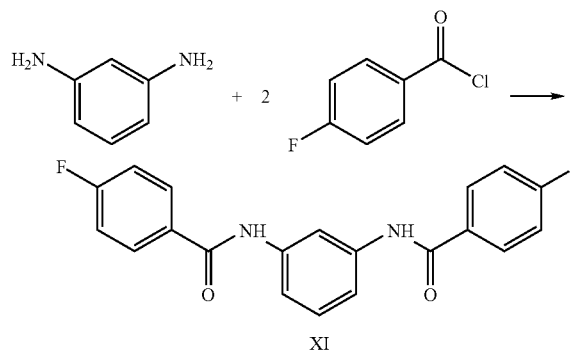

1,3-Phenylenediamine (10.8 g, 0.1 mol) was dissolved in 500 ml dichloromethane and triethylamine (28.0 ml, 20.2 g, 0.2 mol) was added. The solution was chilled to 0° C. before 4-fluorobenzoyl chloride (24.0 ml, 31.7 g, 0.2 mol) was added dropwise over the course of about 30 minutes. After stirring for 2 hours at 0° C., the solution was allowed to warm to room temperature (about 25° C.) and stirred for 18 hours. The resulting precipitate was isolated by filtration and suction dried. The precipitate was resuspended in 300 ml of refluxing ethanol for 30 minutes then cooled, isolated by filtration, rinsed with ethanol, suction dried, and vacuum dried in an oven overnight. The yield was 32.0 g of white powder.

EXAMPLE 6

In one embodiment of the present invention, the monomer 2,6-bis(4-fluorobenzoylamino)pyridine XII may be synthesized according to the following reaction:

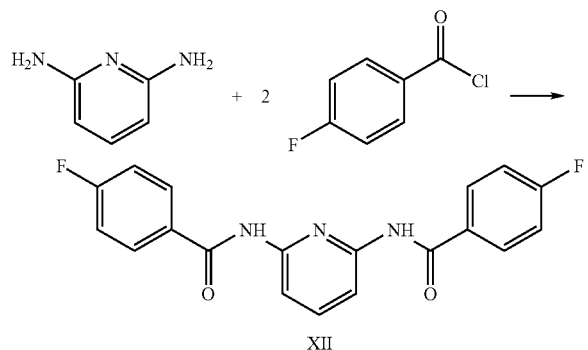

2,6-Diaminopyridine (10.9 g, 0.1 mol) was dissolved in 500 ml of dichloromethane, and triethylamine (28.0 ml, 20.2 g, 0.2 mol) was added. The solution was chilled to 0° C. before 4-fluorobenzoyl chloride (24.0 ml, 31.7 g, 0.2 mol) was added dropwise over the course of about 30 minutes. After stirring for 2 hours at 0° C., the solution was allowed to warm to room temperature (about 25° C.) and stirred for 18 hours. The resulting precipitate was isolated by filtration and suction dried. The precipitate was recrystallized from 300 ml of refluxing ethanol, isolated by filtration, rinsed with ethanol, suction dried, and vacuum dried in an oven overnight. The yield was 34.0 g of white crystals.

Non-ferromagnetic or weakly ferromagnetic nanoparticles may be made from but are not limited to 1) Co, Fe, Ni, 2) compounds of Co, Fe and Ni with Pd or Pt, and 3) Au or Sb doped versions of all these materials and compounds. FePt nanoparticles may be doped with Au, Sb, Ag, Pd, Cr, or Cu. Nanoparticles of AlMn may be used within the scope of the present invention, including Au and Sb doped versions of the same. Ni and Mn may also serve as dopants within the scope of the present invention. Nanoparticles of the different materials may be used in combinations in accordance with the present invention. Non-ferromagnetic or weakly ferromagnetic nanoparticles may be synthesized according to the following examples.

EXAMPLE 7

In one embodiment of the present invention, non-ferromagnetic or weakly ferromagnetic cobalt (Co) nanoparticles may be synthesized from dicobalt octacarbonyl ($CO_2(CO)_8$). $CO_2(CO)_8$ (0.54 g) may be dissolved in 3 ml of o-dichlorobenzene by vigorous shaking to prepare the precursor solution. A flask containing 200 microliters of oleic acid and 100 milligrams (mg) of tri(n-octyl)phosphine oxide dissolved in o-dichlorobenzene may be heated under nitrogen to reflux at 182° C. The precursor solution may be injected into the flask and the reaction may be held at reflux for 15 minutes and then cooled by removing the heat source. The nanoparticles may be separated from the solution by precipitating with ethanol and centrifuging.

To facilitate interaction with the polymer matrix, the nanoparticles may be functionalized with a functionalized surfactant such as 7-(5-uracil-ylcarbamoyl)heptanoic acid,

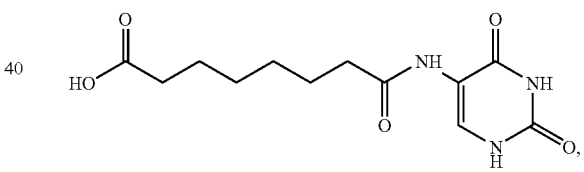

prepared from the reaction of 5-aminouracil with a stoichiometric amount of suberic anhydride in N,N-dimethylformamide (DMF).

The nanoparticles were agitated in a 0.1 M solution of the acid in DMF for 48 hours, then separated from the excess 7-(5-uracil-ylcarbamoyl)heptanoic acid by centrifugation. The uracil functional group of the 7-(5-uracil-ylcarbamoyl) heptanoic acid, may preferentially form hydrogen bonds with nitrogen containing moieties within the polymer matrix, such as guanidinium, uracilyl, urea, imine, amide, or amine groups for example. Such thermally reversible interactions between the nanoparticles and the polymer matrix may discourage particle aggregation and therefore promote uniform dispersal of nanoparticles in the matrix. Nanoparticles may be allowed to rotate within the matrix during particle alignment due to the reversible nature of the hydrogen bonds.

The functionalized nanoparticles may be evenly dispersed in a polymer matrix by agitating a cyclohexanone solution of 12 mg/ml of nanoparticles and 3 mg/ml of a polymer in at 60° C. for 24 hours, then spin casting this composite solution at 2000 revolutions per minute (rpm) for 60 seconds into a thin film and allowing the solvent to evaporate. The resulting film may be about 30 nm thick and have 80% nanoparticle concentration by weight.

Ferromagnetism may be induced or enhanced in the nanoparticles by heating the film dispersion at a temperature, $T_{FM}$, of about 300° C. for 3 hours under vacuum. This may convert the nanoparticles to the ferromagnetic, hexagonal close packed (hcp) phase. The ferromagnetic nanoparticles may be aligned within the polymer matrix by applying a 10 kOe magnetic field to the dispersion while at a temperature, $T_A$, of about 180° C. for about 3 hours. The films may be heated using a temperature controlled sample stage placed between the poles of a vibrating sample magnetometer to provide the magnetic field. A film on tape may be passed, for example, over radiant heaters which are between the poles of a magnet or series of magnets which provide the magnetic field.

EXAMPLE 8

In one embodiment of the present invention, non-ferromagnetic or weakly ferromagnetic gold-doped iron-platinum (FePtAu) nanoparticles may be synthesized by heating a flask containing 98 mg of platinum (II) acetylacetate (Pt(acac)$_2$), 5 mg of gold (III) chloride (Au(Cl)$_3$), 240 mg of 1-adamantanecarboxylic acid, 2.4 g of hexadecylamine, and 10 ml of phenyl ether under nitrogen to 160° C. Sixty-six microliters of iron pentacarbonyl (Fe(CO)$_5$) may be added via syringe and the solution may be heated at a rate of about 3° C./minute to about 220° C. This temperature may be maintained for about 1 hour, and then the solution may be refluxed (at about 260° C.) for about 3 hours. When cool, the nanoparticles may be separated from the solution by precipitating with ethanol and centrifuging.

Figure 5:
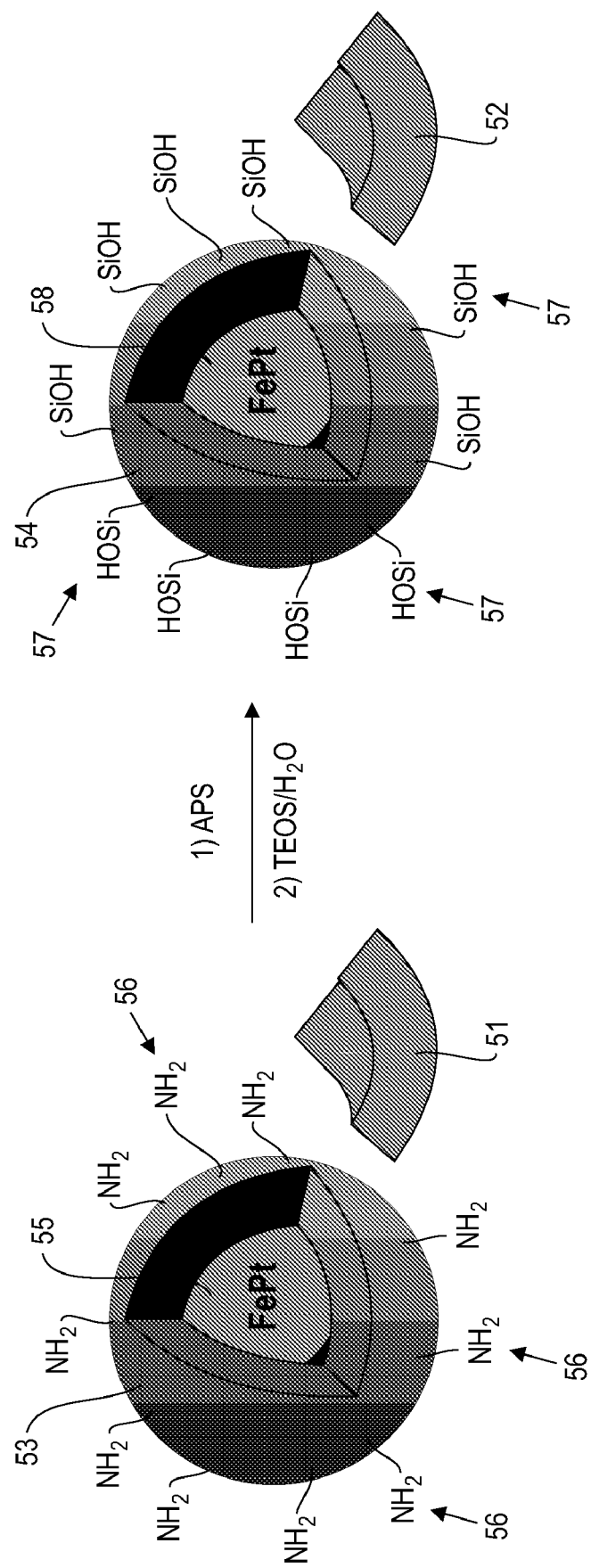
FIG. 5 is an illustration of a functionalization reaction of FePt nanoparticles.

To facilitate interaction with the polymer matrix, the nanoparticles may be functionalized with silicate precursors. FIG. 5 is an illustration of a functionalization reaction of the above synthesized FePt nanoparticles with 3-aminopropyltriethoxysilane (APS) and tetraethoxysilane (TEOS). FIG. 5 depicts a reactant nanoparticle with shell 53 of amine functionalized groups covering the FePt core 55, as produced by the synthesis steps above. A cut-away section 51 is removed to show the FePt core 55. The product nanoparticle is shown with FePt core 58 made visible with the cut-away section 52 of the silicate precursor shell 54, where the surface layer is comprised of —SiOH functionalized groups 57.

The nanoparticles may be coated with a silica shell by combining 400 ml of a 1 mM (millimolar) solution of 3-aminopropyltriethoxysilane in ethanol with 10 ml of the nanoparticle dispersed in hexane at 0.1 mg/ml concentration. This solution may be agitated for two hours, then the nanoparticles may be isolated with a strong magnet and the solution removed. The nanoparticles may be added to a 2 liter solution of 280 microliters of TEOS in dibenzyl ether. The solution may be stirred while adding 200 ml of deionized water followed by stirring for an additional 3 hours. The nanoparticles may be collected with a strong magnet, while the solution is removed, and may be washed with ethanol.

The functionalized nanoparticles may be evenly dispersed in a polymer matrix by agitating a cyclohexanone solution of 12 mg/ml of nanoparticles and 3 mg/ml of a polymer at 60° C. for 24 hours, then spin casting this composite solution at 2000 rpm for 60 seconds into a thin film and allowing the solvent to evaporate. The resulting film may be about 30 nm thick and have 80% nanoparticle concentration by weight.

Ferromagnetism may be induced or enhanced in the nanoparticles by heating the dispersion at $T_{FM}$=400° C. for 3 hours under 5% (vol./vol.) hydrogen in argon. The ferromagnetic nanoparticles may be aligned by applying a 10 kOe magnetic field to the dispersion while heating at a temperature $T_A$ of 200° C. for 3 hours. The films may be heated using a temperature controlled sample stage placed between the poles of a vibrating sample magnetometer to provide the magnetic field. A film on tape may be passed, for example, over radiant heaters which are between the poles of a magnet or series of magnets which provide the magnetic field.

The foregoing description of the embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

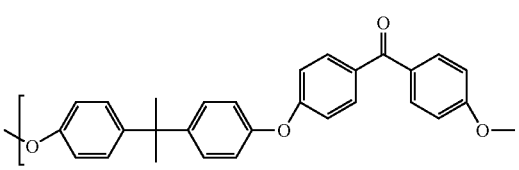

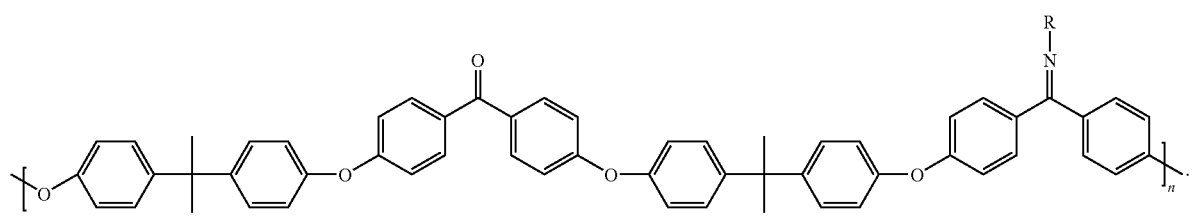

-continued
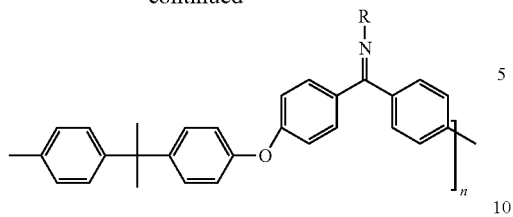
wherein n is between about 8 and about 200,
wherein $R^1$ is selected from the group consisting of
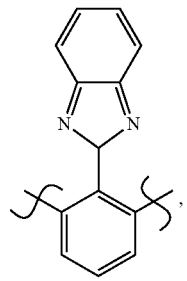
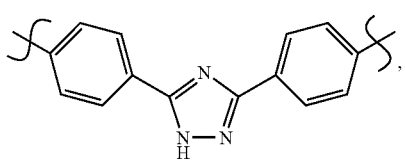
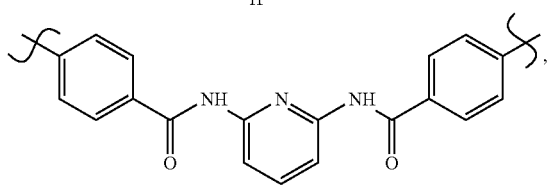
and
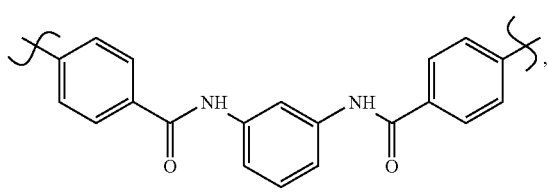
and R is selected from the group consisting of
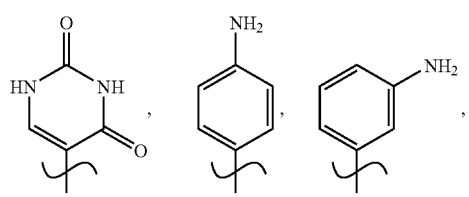
21. The method of claim 20, wherein said polymer has the general formula
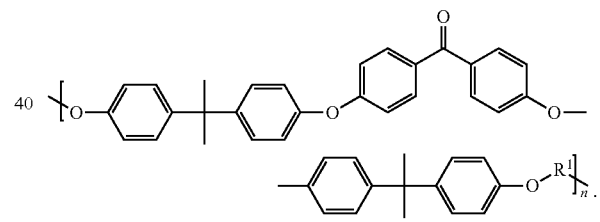
22. The method of claim 20, wherein said polymer has the general formula
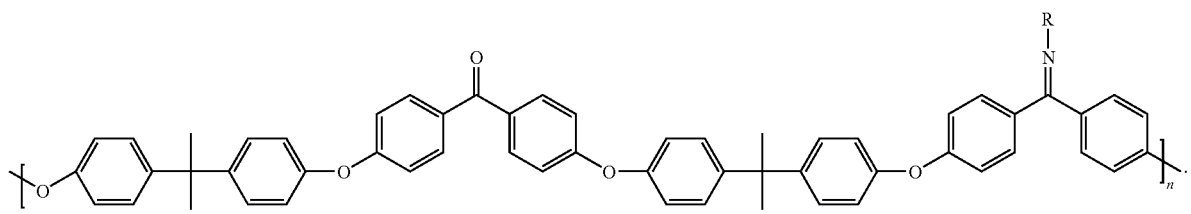

The invention claimed is:

1. A method for forming and aligning chemically mediated dispersion of magnetic nanoparticles in a polymer, comprising:

providing Au-doped Co nanoparticles, said Au-doped Co nanoparticles comprising a combination of non-ferromagnetic Au-doped Co nanoparticles and weakly ferromagnetic Au-doped Co nanoparticles, said Au-doped Co nanoparticles each having an exterior surface;

functionalizing said surfaces of Au-doped Co nanoparticles with 7-(5-uracil-ylcarbamoyl)heptanoic acid;

providing a polymer wherein the chemical structure of said polymer has at least one functional group, said polymer having the general formula:

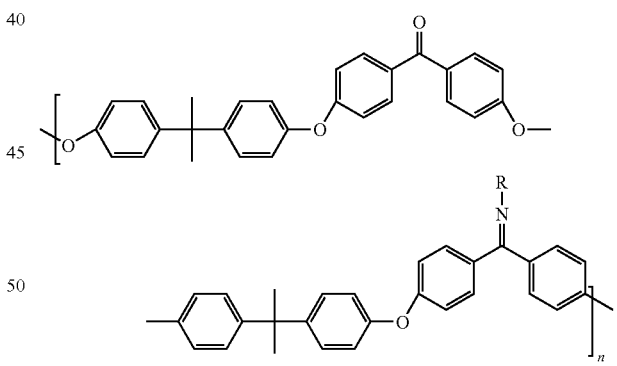

wherein n is between about 8 and about 200, and where R is

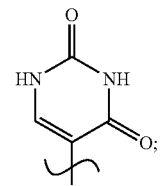

after said functionalizing, forming a dispersion of said Au-doped Co nanoparticles in said polymer by agitating a cyclohexanone solution of said Au-doped Co nanoparticles and said polymer;

spin casting said solution into a film and allowing said cyclohexanone to evaporate;

heating said film under vacuum at a first temperature, $T_{FM}$, between about 100° C. and about 500° C., resulting in inducing ferromagnetism in said non-ferromagnetic Au-doped Co nanoparticles in said polymer and converting said non-ferromagnetic Au-doped Co nanoparticles to ferromagnetic Au-doped Co nanoparticles, and resulting in enhancing ferromagnetism in said weakly ferromagnetic Au-doped Co nanoparticles in said dispersion; and after said heating, aligning said Au-doped Co nanoparticles such that magnetic easy axes of said Au-doped Co nanoparticles are oriented in substantially the same direction by applying a 10 kOe magnetic field to the dispersion while at a second temperature, $T_A$, less than $T_{FM}$, said magnetic easy axes aligning in a plane parallel to a plane of said film.

2. A method, comprising:

providing a dispersion comprising nanoparticles in a matrix, wherein said matrix is a polymer, wherein said nanoparticles are non-ferromagnetic nanoparticles, weakly ferromagnetic nanoparticles, or a combination thereof;

annealing said dispersion at a first temperature $T_{FM}$, thereby converting any non-ferromagnetic nanoparticles in said dispersion to ferromagnetic nanoparticles, and enhancing ferromagnetism in any weakly ferromagnetic nanoparticles in said dispersion; and after said annealing, applying a magnetic field to said dispersion to align said nanoparticles wherein magnetic easy axes of said ferromagnetic nanoparticles are oriented in substantially the same direction while said dispersion is heated to a second temperature $T_A$, and wherein said polymer has the general formula

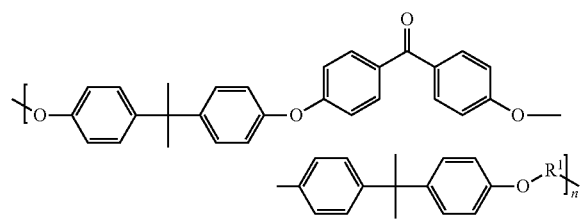

or

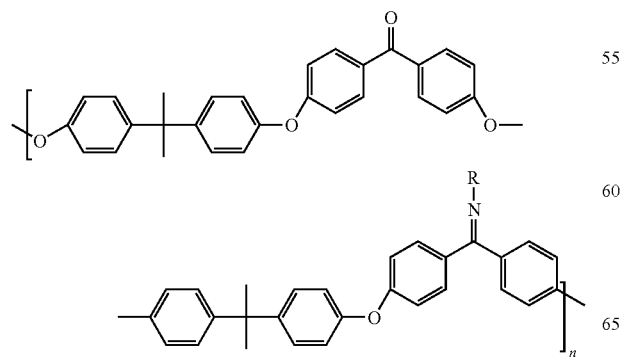

wherein n is between about 8 and about 200, wherein $R^1$ is selected from the group consisting of

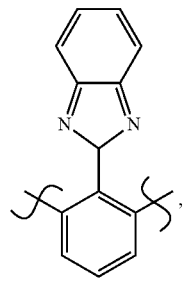

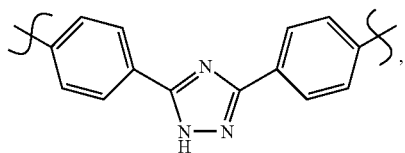

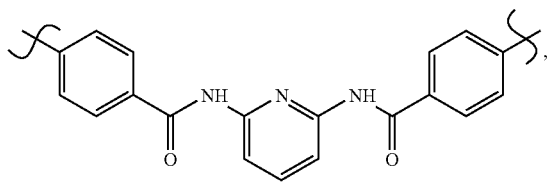

and

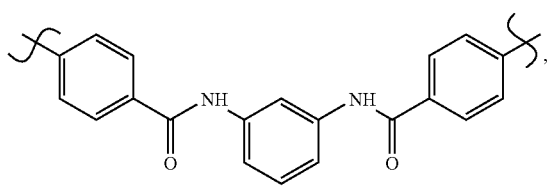

and R is selected from the group consisting of

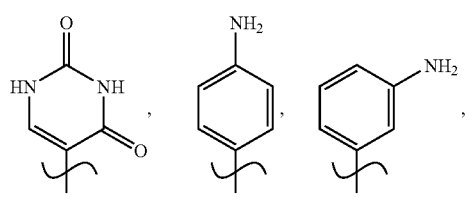

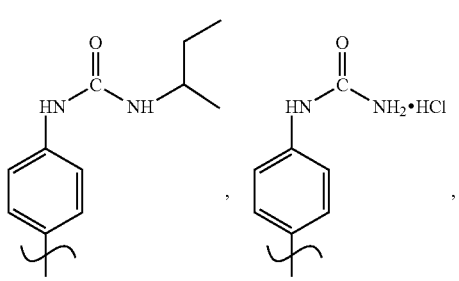

-continued

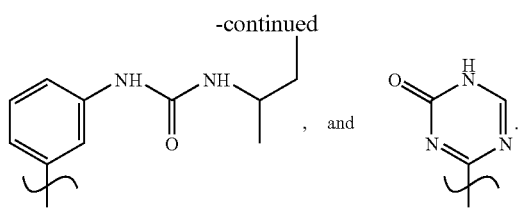

3. The method of claim 2, wherein said dispersion comprises a film.

4. The method of claim 3, further comprising forming magnetic tape from said film before said annealing of said dispersion.

5. The method of claim 2, wherein said film has a thickness in the range of about 3 nanometers (nm) to about 50 microns.

6. The method of claim 2, wherein $T_{FM}$ and $T_A$ are each in the range of about 50 °C. to about 500 °C.

7. The method of claim 2, wherein said nanoparticles in said matrix are non-ferromagnetic nanoparticles in said matrix.

8. The method of claim 2, wherein said nanoparticles in said matrix are weakly ferromagnetic nanoparticles in said matrix.

9. The method of claim 2, wherein said nanoparticles have a concentration between about 5% and about 99% by weight in said dispersion.

10. The method of claim 2, wherein said magnetic field has a magnetic field strength between about 500 oersteds (Oe) and about 20,000 Oe.

11. The method of claim 2, wherein $T_{FM}$ is either higher than $T_A$ or lower than $T_A$.

12. The method of claim 2, wherein $T_{FM}$ and $T_A$ are substantially the same temperature.

13. The method of claim 2, wherein said polymer has the general formula

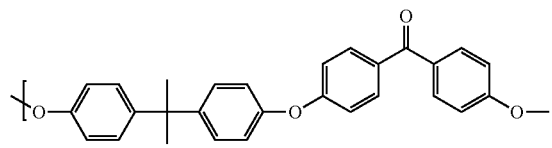

14. The method of claim 2, wherein said polymer has the general formula

15. A method, comprising:
providing non-ferromagnetic nanoparticles, said nanoparticles each having an exterior surface;
functionalizing said surfaces of said non-ferromagnetic nanoparticles;
providing a polymer wherein the chemical structure of said polymer has at least one functional group;
after said functionalizing, forming a dispersion of said non-ferromagnetic nanoparticles in said polymer;
inducing ferromagnetism in said nanoparticles in said polymer, thereby converting said non-ferromagnetic nanoparticles to ferromagnetic nanoparticles; and
aligning said ferromagnetic nanoparticles such that magnetic easy axes of said ferromagnetic nanoparticles are oriented in substantially the same direction.

16. The method of claim 15, wherein said functionalizing said surfaces of said non-ferromagnetic nanoparticles comprises functionalizing said surfaces with a functionalized surfactant, silica, or a combination thereof.

17. The method of claim 16, wherein said functionalized surfactant is 7-(5-uracil-ylcarbamoyl)heptanoic acid.

18. The method of claim 15, wherein said at least one functional group comprises a nitrogen containing group.

19. The method of claim 15, wherein said nanoparticles comprise a material selected from the group consisting of Fe, Co, Ni, AlMn, and combinations thereof.

20. The method of claim 18, wherein said polymer has the general formula

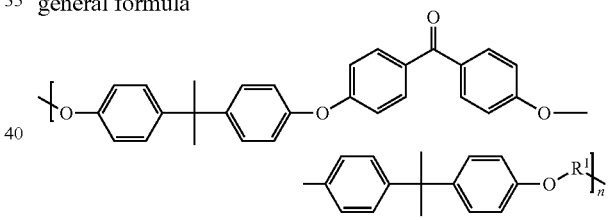

or